Figure 1:
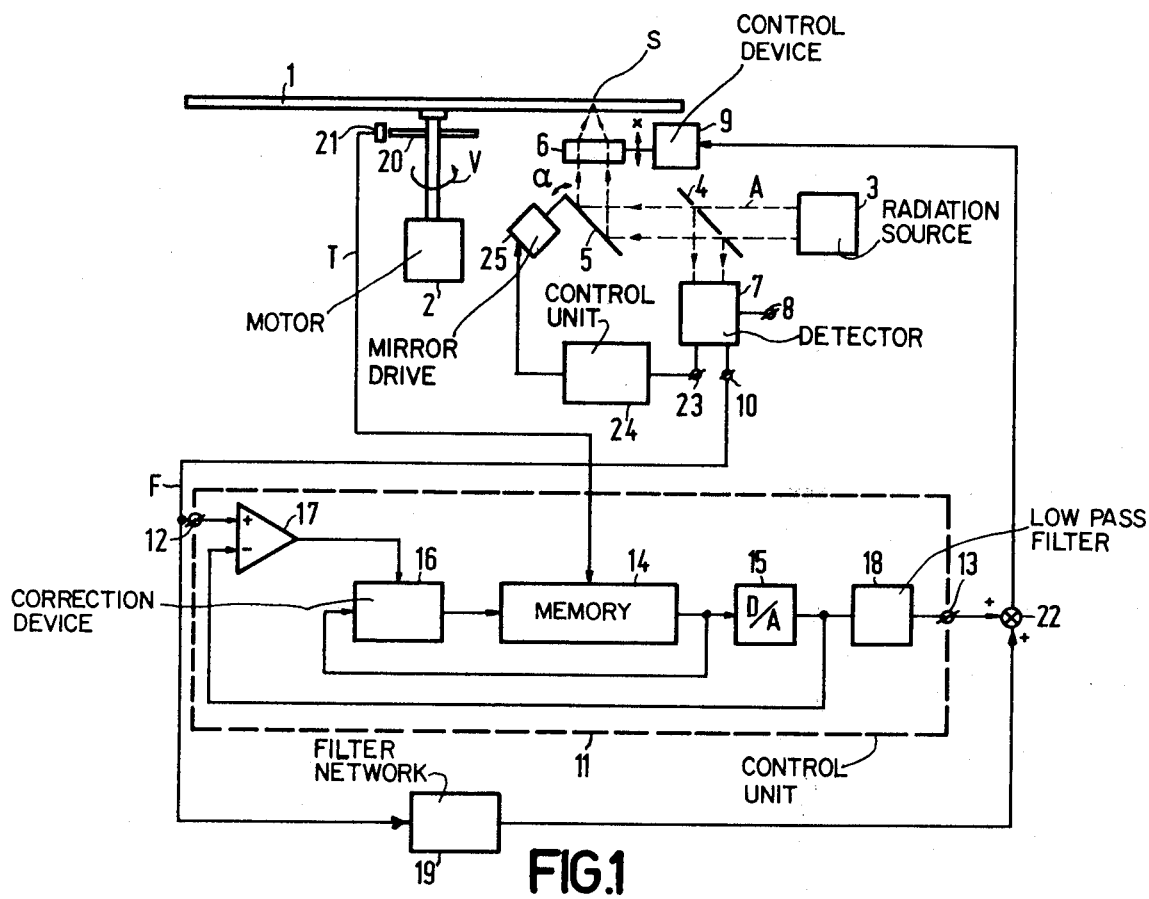

United States Patent [19]

Immink et al.

[11] 4,286,318
[45] Aug. 25, 1981

[54] CONTROL LOOP

[75] Inventors: Kornelis A. Immink; Abraham Hoogendoorn, both of Eindhoven, Netherlands

[73] Assignee: U.S. Philips Corporation, New York, N.Y.

[21] Appl. No.: 40,794

[22] Filed: May 21, 1979

[30] Foreign Application Priority Data

May 3, 1979 [NL] Netherlands ............ 7901721

[51] Int. Cl.³ .............................................. G05B 11/01
[52] U.S. Cl. ................... 364/118; 358/128.5;
358/227; 360/69; 364/553; 369/44
[58] Field of Search ............... 364/118, 105, 553, 111,
364/112, 107; 358/127, 128.5, 130, 227;
250/201; 356/123, 125; 360/27, 69, 31;
179/100.3 V, 100.4 D

[56] References Cited

U.S. PATENT DOCUMENTS

| | | | |
|---|---|---|---|
| 3,752,969 | 8/1973 | Kiffmeyer et al. | 364/118 X |
| 3,798,624 | 3/1974 | Baxter et al. | 364/118 X |
| 4,007,363 | 2/1977 | Lemmrich | 364/118 |
| 4,012,634 | 3/1977 | Bouton et al. | 364/118 X |
| 4,099,113 | 7/1978 | Hayashi | 364/118 X |
| 4,141,065 | 2/1979 | Sumi et al. | 364/118 X |

*Primary Examiner*—Joseph F. Ruggiero
*Attorney, Agent, or Firm*—Thomas A. Briody; William J. Streeter; Algy Tamoshunas

[57] ABSTRACT

A control loop provided with a control unit for realizing a transfer characteristic having a number of peaks at a fundamental frequency and harmonics thereof. The control unit comprises a memory device for digitally storing a number of samples of the error signal appearing in the control loop during a cycle period equal to the period corresponding to the fundamental frequency. Furthermore, there are provided means for comparing the sample stored in the memory device with the value of the error signal one cycle period later and, depending on this comparison, correcting the memory content of the relevant memory location. The variation of the error signal stored in the memory device is furthermore cyclically employed as a control signal for the control device included in the control loop.

11 Claims, 7 Drawing Figures

CONTROL LOOP

The invention relates to a control loop for controlling a control quantity, which control loop is provided with a control device for changing the control quantity in response to a control signal, a detection system for supplying an error signal which is indicative of the difference between the instantaneous value and the desired value of the control quantity, and a control unit having an input terminal, which is coupled to the detection system for receiving the error signal, and an output terminal, which is coupled to the control device for supplying the control signal, which control unit has a transfer characteristic with a number of peaks at a fundamental frequency and harmonics thereof.

At present control loops play an important part in various types of equipment. A specific example of this are servo control loops for controlling the position of a control member. The requirements imposed on such control loops may be very stringent. In order to illustrate this, two examples of equipment are given in which one or more of such control loops play an essential part.

A first example is an optical read apparatus for disc-shaped record carriers, on which video and/or audio information is recorded in an optically detectable structure. Such a record carrier generally comprises a spiral information track which is read by a radiation beam. In order to realize this at least two control loops are necessary. First of all a control loop is required to control the radial position of the scanning spot formed on the record carrier by the radiation beam, i.e. to ensure that the scanning spot always coincides with the information track regardless of any eccentricity of the record carrier. Secondly, a control loop is required to ensure that the radiation beam remains accurately focussed on the information surface of the record carrier regardless of any variations in the flatness of the disc-shaped record carrier. Finally, a further control loop is generally required to correct time errors in the signal read by controlling the position of the scanning spot in the track direction.

A second example is a recording and reproducing system for video signals, a magnetic tape being employed as the record carrier. The information is then generally recorded on the magnetic tape in accordance with a pattern of mutually parallel tracks, which make a small angle with the longitudinal axis of the magnetic tape. For this purpose the magnetic tape is passed along a portion of the periphery of a rotating head disc accommodating the magnetic heads which are adapted to record and read the video signals. In order to increase the information density on the magnetic tape, the trend is to reduce both the track width an the spacing between the tracks. This in turn imposes more stringent requirements on the accuracy with which the magnetic heads must follow the tracks. In order to realize this, each of the magnetic heads are not rigidly mounted on the head disc but instead are supported on an adjusting member, for example, a piezo-electric deflection element, which is capable of adjusting the position of the magnetic heads in a direction transverse to the track direction. With the aid of tracking signals recorded on the magnetic tape and an associated detection circuit, a control loop is then realized which ensures that each of the magnetic heads always accurately cooperates with the desired track.

For such a control loop to provide sufficiently accurate control of the control quantity, the overall transfer characteristic of the control loop should comply with stringent requirements. As an example, the gain of the control loop, the so-called open-loop gain, should be sufficiently high in the frequency range of the error signal. In the case of a control loop of conventional design this generally means that the the control loop should have a low-pass transfer characteristic with more or less flat response from zero frequency up to a maximum frequency to be controlled. In general, the drawback of such a transfer characteristic is that it is difficult to obtain a high gain factor and at the same time to ensure the stability of the control loop, so that generally a compromise is made and additional networks have to be included in order to guarantee the desired stability. Moreover, one drawback of such system is that noise signals within the frequency band of the low-pass characteristic are also fully amplified and consequently may seriously affect the control behaviour of the loop.

In order to overcome these problems Netherlands Patent Application No. 7702990 proposes a control loop of the type mentioned in the preamble, which makes effective use of the fact that in the case of a multitude of controls the error signal mainly comprises a number of components of fixed frequencies, namely a fundamental frequency and a number of harmonics thereof. In the first-mentioned example of a read apparatus it has, for example, been found that for the associated control systems the error signal has strong components at a fundamental frequency, which corresponds to the revolution frequency of the record carrier, and harmonics thereof. Similarly, in the second example mentioned above, it has been found that the error signal has strong components at a fundamental frequency, which corresponds to the revolution frequency of the head disc, and harmonics thereof.

The aforementioned Netherlands patent application makes effective use of this datum and proposes to realize a transfer characteristic with a number of peaks at the fundamental frequency and harmonics thereof. This ensures that a high loop gain is obtained for the significant frequencies of the error signal, while the loop gain is lower for the less significant frequencies. This ensures both that the influence of noise signals is substantially reduced, so that a considerably smoother control behaviour is obtained, and that the stability of the control loop can be guaranteed in a substantially simpler manner.

In the control loop described in the Netherlands patent application, the desired transfer characteristic is obtained with the aid of a number of parallel-connected band-pass filters each adjusted to a separate frequency associated with the fundamental frequency and harmonics thereof. In order to achieve an optimum reduction of the error signal it is obviously desirable that the gain factor at said frequency is as high as possible, whilst on the other hand it is desirable that the bandwidth of the band-pass characteristics around these frequencies is minimal. In other words, it is desirable that the band-pass characteristics around these frequencies have a quality factor which is as high as possible. When parallel-connected band-pass filters are used, as stated in the Netherlands patent application, it is difficult to achieve a very high quality factor. Moreover, this arrangement demands a separate filter for each harmonic of the fundamental frequency which is of any significance for control, so that such an arrangement may require a large number of elements. Moreover, it is expensive to manufacture because of the necessary adjustments to the band-pass filters.

It is the object of the invention to provide a control loop of the type mentioned in the preamble, the desired transfer characteristic being realized in a manner which is particularly effective and advantageous in respect of manufacturing technology. To this end the invention is characterized in that the control unit is provided with a memory device with a plurality of memory locations adapted to store digitally coded signal values, a digital-analog converter, coupled to the memory device, for the conversion of the digitally coded signal values supplied by the memory device into analog signal values, comparison means for comparing the value of the error signal represented by the signal value read from the memory device with the instantaneous value of this error signal, correction means, coupled to the memory device as well as to the output of the comparator, for correcting the signal values obtained from the memory device depending on the signal supplied by the comparator, the correction applied having a maximum value which is small relative to the maximum attainable signal value, and control means for the memory device, adapted to read a number of signal values from the memory device in accordance with a recurrent cycle and, each time after reading a signal value, to store the corrected signal value supplied by the correction means in the memory instead of the signal value read, the cycle having a period equal to that associated with the fundamental frequency.

The proposed construction of the control unit ensures that the transfer function realized by this control unit can have very steep peaks without the attendant extremely stringent accuracy requirements in respect of the elements used. The variation of the transfer function greatly depends on the parameters which influence the digital signal values, such as the number of bits employed for the signal values and the degree of correction performed by the correction device. However, tolerances in respect of the circuits employed in the control unit play a subordinate part in respect to their influence on the transfer characteristic.

It is to be noted that Netherlands Patent Application No. 7703539 describes a control loop which also realizes a transfer characteristic with a number of peaks at a fundamental frequency and harmonics thereof. Such a characteristic is realized inter alia by means of a so-called comb filter with a delay means.

A preferred embodiment of the control loop in accordance with the invention is characterized in that the correction means are adapted to increase or decrease digital signal values read from the memory device by a predetermined value depending on the polarity of the signal on the output of the comparator.

The conrol loop in accordance with the invention, in particular the control unit, is particularly suitable for the use of a programmable control circuit, such as a microprocessor. By means of this control circuit it is possible to read and write the signal values in the correct memory locations and to correct said signal values. The use of such a control circuit obviously has the advantage of a high flexibility, i.e. by appropriate changes to the program, the control unit can be simply adapted to specific requirements imposed by the quantity to be controlled.

With respect to the construction of the control unit, especially as regards the elements used therein, there are numerous possibilities. A preferred embodiment is characterized in that the comparison means are provided with a differential amplifier having a first input, which is coupled to the input terminal of the control unit, and a second input which is coupled to the output of the digital-analog converter. This preferred embodiment excels in respect of the simplicity of the comparison means.

In order to meet the requirements imposed on the overall transfer characteristic of the control loop, it is generally required to include additional low-pass filters in series with the control unit, which filters generally introduce an additional delay. In a preferred embodiment of the control loop in accordance with the invention this delay is compensated for in that there are provided means for applying signal values, which have been read from the memory device and converted into analog form, to the output terminal of the control unit, which signal values lead the signal values applied to the comparison means.

In order to meet specific requirements in respect to the transfer characteristic, a further preferred embodiment is characterized in that the input terminal of the control unit is coupled to the input of a filter network. The output of the filter network is coupled to an adder stage, which is also coupled to the output terminal of the control unit and adds the output signals of the control unit and of the filter network to each other and supplies the sum signal to the control device as the control signal.

In addition, a special protection against certain interference signals can be obtained in that the filter network comprises a limiter circuit for limiting the output signal of the filter network to a predetermined value.

Figure 2:
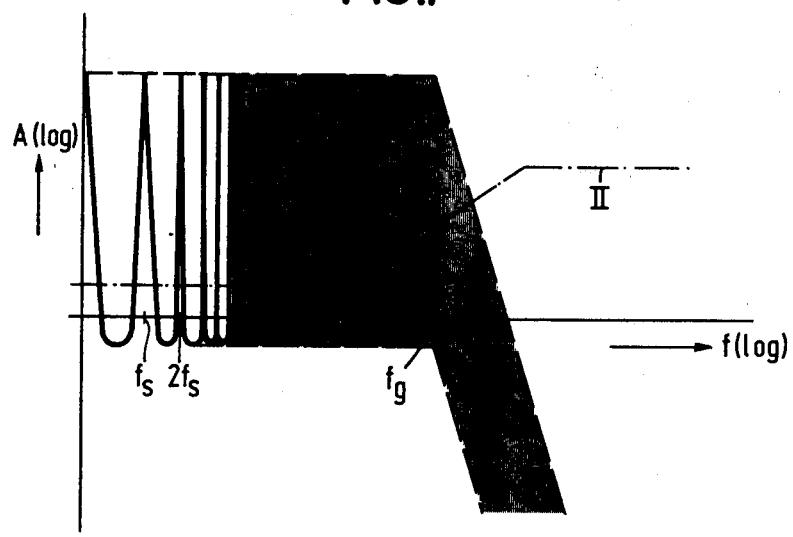
Figure 3:
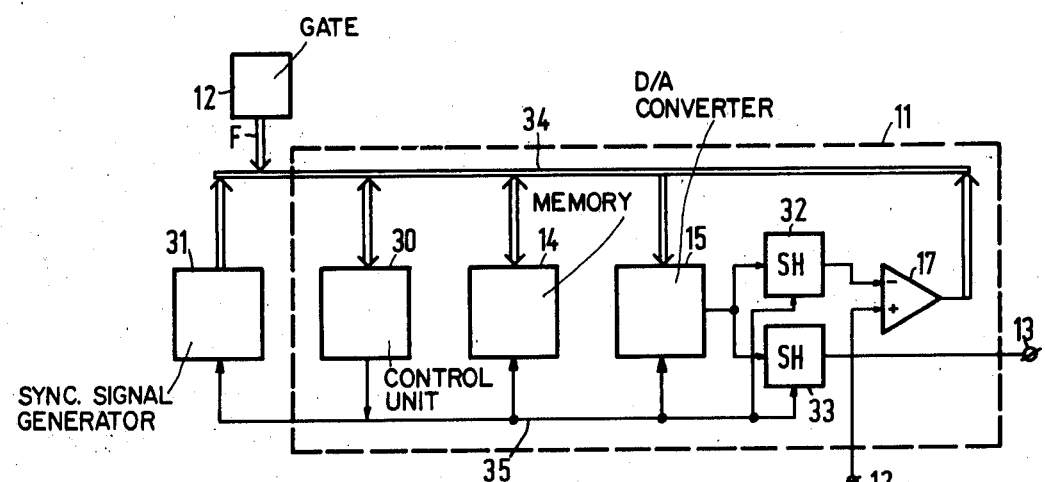
Figure 4:
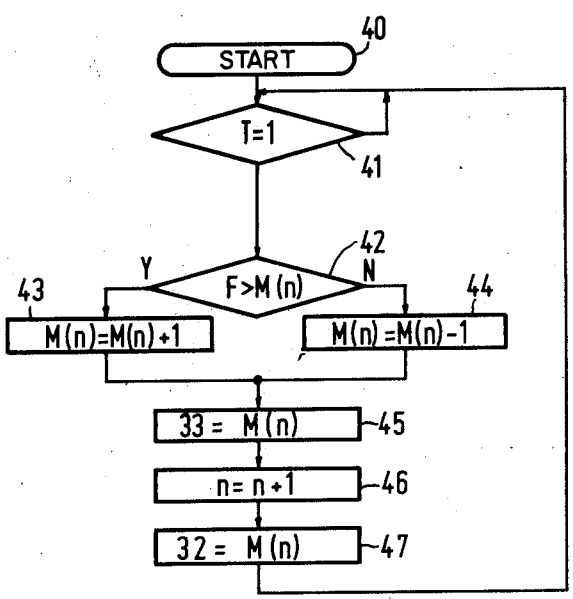
Figure 5:
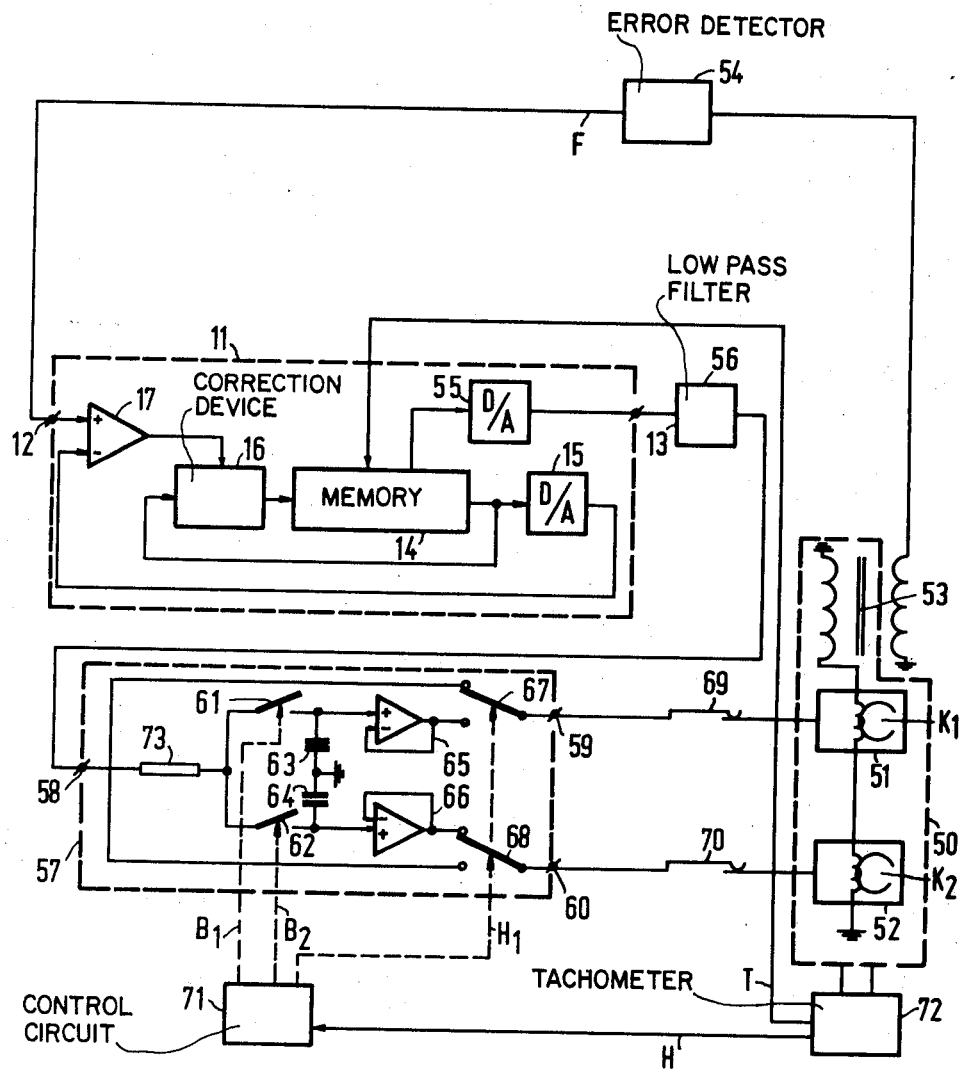
Figure 6:
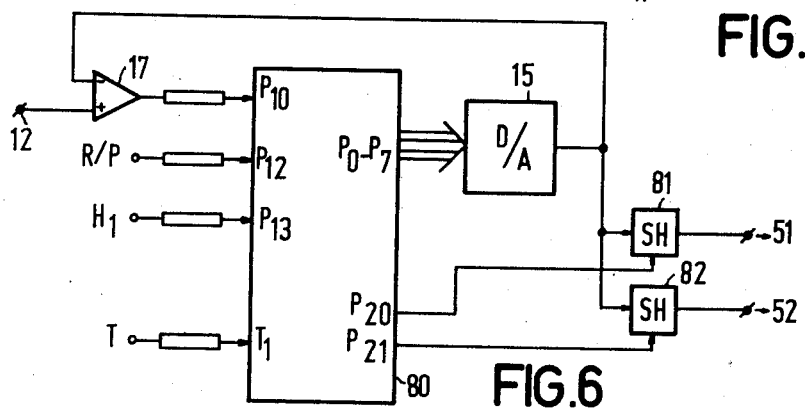
Figure 7:
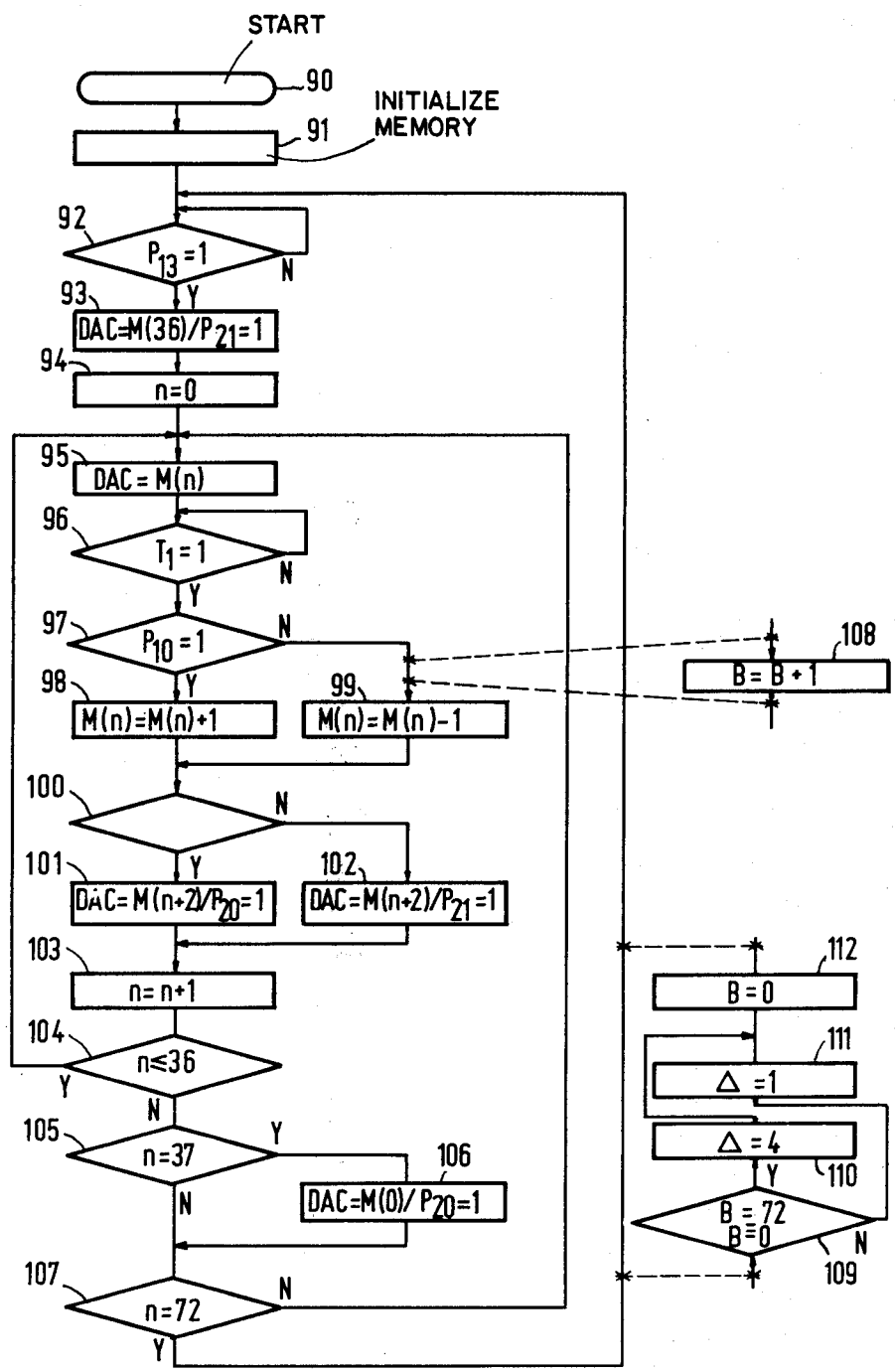

The invention is described in more detail with reference to the Figures, in which:

FIG. 1 shows a first embodiment of the control loop in accordance with the invention, employed in an apparatus for reading a disc-shaped record carrier, FIG. 2 shows the transfer characteristic of the control unit, FIG. 3 schematically represents the construction of the control unit, use being made of a programmable control circuit, FIG. 4 represents a flow diagram of the program for the control circuit of FIG. 3, FIG. 5 shows an embodiment of the control loop in accordance with the invention used in an apparatus for reading a magnetic record carrier in the form of a tape, FIG. 6 shows the control unit for the embodiment of FIG. 5 using a programmable control circuit, and FIG. 7 represents a flow diagram of the program for the control unit shown in FIG. 6.

FIG. 1 schematically represents an apparatus for reading a disc-shaped record carrier equipped with a control loop in accordance with the invention. The disc-shaped record carrier 1 is rotated in direction V by a motor 2 and read by a radiation beam A, which is emitted by a radiation source 3. The beam is directed onto the information surface on the record carrier 1 by a semi-transparent mirror 4, a mirror 5 and a lens system 6. The information surface is reflective so that the radiation beam A is reflected therefrom, passes through the lens system 6 and is directed by the mirror 5 and the semi-transparent mirror 4 onto a detection device 7. The detection device 7 converts the information contained in the radiation beam A, for example video information, into an electrical signal, which is then available for further processing at an output terminal 8.

In order to maintain the radiation beam A accurately focussed to a spot S on the information surface in spite of vertical movements of the latter, there is provided a focussing control loop. The focussing control loop comprises a drive means 9 which moves the lens system 6 in the X-direction and controls the focussing of the radiation beam A on the record carrier. Furthermore, this control loop should also include a detection system for supplying an error signal which is a measure of the deviation in the focusing. In the present example it is assumed that this detection system forms part of the detection device 7 and produces an error signal on a terminal 10. Systems for detecting focusing errors are known in a large number of versions. Since the manner in which the error signal is obtained is of subordinate significance for the present invention this will not be discussed in detail. U.S. Pat. Nos. 3,876,841 and 4,011,400, for example, disclose such focussing error detection systems. The control loop, furthermore, includes a control unit 11, whose input terminal 12 is connected to the terminal 10 of the detection system 7 and which consequently receives the error signal. The output signal of control unit 11 appears on output terminal 13 and is applied to the control device 9 as the control signal.

The control unit 11 is adapted to realize a transfer characteristic with a number of peaks at 0 frequency, a fundamental freqency, and a number of harmonics thereof, the fundamental frequency being equal to the revolution frequency of the record carrier. The choice of such a transfer characteristic is based on the recognition that the frequency spectrum of the error signal contains comparatively strong components at this fundamental frequency and consecutive harmonics thereof. In order to obtain an effective control it is therefore desirable to employ a transfer characteristic which provides a high gain at this frequency. On the other hand, it is less desirable to have such a high gain factor for the entire frequency range, because in that case any noise signals associated with the error signal have a great influence on the control and it is also difficult to realize a stable control loop with such a transfer characteristic.

In order to obtain an effective control which is highly immune to noise signals, it is therefore desirable that the gain factor for these frequencies is substantially greater than that for other frequencies. At the same time, the width of the frequency bands at the frequencies for which a high gain factor is desirble should be small, which means that a high quality factor is required for the band-pass characteristics at those frequencies.

In order to achieve this, the control unit 11, in accordance with the invention, has construction schematically shown in the Figure. This construction guarantees a high quality factor, with the tolerances of the elements used having only a minimal influence. The control unit 11 comprises a memory device 14, suitable for storage of a number of signal values in digitally coded form. The output of the memory device 14 is connected to a digital-analog converter 15, which converts the digital signal values into analog signal values. Furthermore, the output of the memory device 14 is connected to a correction device 16, whose output in turn is connected to the input of the memory device 14. This correction device receives a correction signal from a comparator 17, which has two inputs, one of which is connected to the input terminal 12 of the control unit and the other to the output of the D/A converter 15. The output of this D/A converter is coupled to the output terminal 13 of the control unit via a matching network 18 and produces a control signal for the control device on the output terminal.

The memory device 14 may, for example, be a digital shift register, the digital signal value stored in the register being transferred to the next register during every clock period. The signal values stored in the memory device 14 cover a time interval $T_o = N/f_o$, where N is the number of registers of the memory device and $f_o$ is the clock frequency. The clock signal for the memory device is derived from the revolution frequency $f_s$ (revolutions/sec.) of the record carrier. For this purpose a tachometer disc 20 with a number of marks (M) may be mounted on the motor shaft. Disc 20 cooperates with a transducer 21 which supplies a pulse train with a repetition frequency $M \cdot f_s$ serving as a clock signal. By means of a frequency divider or frequency multiplier a clock signal $f_o$ for the memory device may be derived therefrom, which signal satisfies the equation $f_o = P \cdot M \cdot f_s$, where P is the multiplication or division factor of the frequency multiplier or divider respectively. Consequently the content of the memory device 14 covers a time interval given by the equation $T_o = N/f_o = N/P \cdot M \cdot f_s$. The number of memory locations N is now selected to equal $P \cdot M$ so that the memory content, i.e. the time interval covered by the signal values stored, exactly corresponds to one revolution period of the record carrier. In other words, the content of the memory device 14 represents the variation of the error signal during one revolution period of the record carrier 1.

Each digital signal value appearing on the output of the memory device 14 is applied to the correction device 16. Moreover, this digital signal value is simultaneously converted into an analog signal value by the D/A converter 15 and this analog signal value is compared with the instantaneous value of the error signal by the comparator 17. Depending on the output signal of this comparator 17 the applied digital signal value is corrected by the correction means 16. The corrected digital signal value is subsequently written into the memory device 14 to take the place of the original digital signal value.

This arrangement provides a transfer characteristic with peaks at 0 Hz frequency, the fundamental frequency $f_s$ and harmonics thereof, as represented by I in FIG. 2. (Both scales have a logarithmic scale graduation). As a result of this, components of the error signal having a frequency $f_s$ or a multiple thereof are amplified to a substantially greater extent than intermediate frequency-components.

The exact shape of the transfer characteristic depends on the design of the correction means 16, in particular the method of correction performed by the correction means. Since the closed loop with the memory device and the correction means operates entirely with digital signal values, the stability of the entire loop is assured regardless of any tolerances in the elements used. Specifically, an error occurring in the closed loop has no cumulative effect, in contradistinction to the process in the case of a closed loop employing analog signals and using an analog shift register as a memory device.

The quality factor of the transfer function, i.e. the slope of the peaks at the fundamental frequency $f_s$ and multiples thereof, is determined by the magnitude of the correction introduced by the correction means 16. In accordance with the simplest correction method the digital signal values read from the memory device 14 are increased or decreased by a value equal to the least significant bit, depending on the polarity of the output signal of the comparator 17. Starting from digital signal values comprising n bits, the feedback factor thus applied between output and input of the memory device via the correction means 16 is $14:k=1\frac{1}{2}n$. The equality factor Q of such a feedback system satisfies the equation $Q=1/(1-k)$, i.e. $Q=2^n$. Thus, in the case of 8-bit digital signal values, a value of 256 is obtained for the quality factor Q. As a result of this high quality, the peaks in the transfer function of FIG. 2 are very steep and narrowbanded. Moreover, tolerances in the elements used have little, if any, influence on the value of the quality factor and the operation of the device. The reason for this is that there is only a transfer of digital signals in the essential feedback path, which as is presumably known is highly insensitive to tolerances. Tolerances in the analog signal processing sections, such as the D/A converter 15 and the comparator 17, do not affect the feedback factor, but in the worst case may temporarily cause an erroneous correction of a digital signal value.

As stated previously, the device described realizes the transfer characteristic of FIG. 2, whilst in principle the bandwidth is not limited, i.e. the pattern I recurs up to high frequencies. Since in general only a limited bandwidth is used, for controlling a control quantity a low-pass filter 18 may be included between the D/A converter 15 and the output terminal 13 of the control unit. As a result of this, the comb-filter characteristic realized by the control unit will fall above a certain cut-off frequency $f_g$ (for example 1 kHz), as shown in FIG. 2. In order to ensure that at the comparatively low frequencies situated between the peak frequencies a certain response of the control loop is obtained, an additional network 19 may be connected in parallel with the control unit 11. The output signal of network 19 and the output signal of the control unit 11 is added in an adder stage 22. The network 19 may for example have a transfer characteristic as designated by II in FIG. 2. Apart from amplifying the low frequencies, this transfer characteristic has a stabilizing effect on the control loop owing to the differentiating character around the cut-off frequency $f_g$. As an additional step a limiter may be included in the network 19, which limits the signal supplied to the adder stage via the network 19 to a certain preset limit value. If said limit value is then such that for real error signals, which should influence the focussing via the network 19, the limitation is not yet active, while said limitation is active for spurious signals of greater amplitude, a high immunity to spurious signals, such as may be produced by signal dropouts on the record carrier as a result of irregularities in the information surface, is achieved without affecting the control behaviour.

In respect of the control unit 11 of FIG. 1 a number of obvious variants are possible. Of course, the error signal applied to the input terminal 12 may first be converted into a digital signal value with the aid of an analog-digital converter, after which this digital signal value may be compared directly with the digital signal value from the output of the memory device 14 and, depending on this comparison, the desired correction of said digital signal value may be applied. However, the embodiment of FIG. 1 has the advantage that it requires no analog-digital converter.

The control unit 11 has been described in the foregoing in connection with the control loop for focusing the scanning spot on the record carrier. However, a similar control unit may also be included in the control loops for other control quantities. As an example, the apparatus for reading the disc-shaped record carrier 1 also comprises a control loop which controls the radial position of the scanning spot S, i.e. which ensures that the scanning spot always coincides with the information track in spite of any eccentricities of the record carrier 1. Again use is then made of a detection system for measuring the radial position of the scanning spot and for generating an error signal. Systems intended for this purpose are known in many variants, so that in FIG. 1 it is assumed that this detection system is included in the detection device 7 and the radial error signal is available on an output terminal 23. This error signal is applied to a control unit 24, having a similar design as the control unit 11 and thus also realizes a transfer function with peaks at the revolution frequency of the record carrier 1 and harmonics thereof. The transfer function may then be given the desired shape by including in the control unit 24 series filters, corresponding to the filter 18, and parallel filters, corresponding to the filter 19. Finally, the output of the control unit 24 is connected to a drive means 25, which is capable of varying the angular position $\alpha$ of the mirror 5 depending on the control signal.

Finally, in connection with the apparatus of FIG. 1, reference may be made to a third possibility for a control system. An eccentricity of the record carrier 1 also introduces time errors in the video signal being read. These time errors may be compensated for by varying the position of the scanning spot S in the track direction, for which purpose an additional controlled deflection element, for example a pivotable mirror, is required. The control signal for this deflection element may be derived from an error signal generated in known manner with the aid of a control unit, which again is of a design similar to that of the control unit 11. Instead of the use of a deflection element the video signal read may also be applied to a variable delay line. The control signal for this delay line may then also be generated by means of such a control unit.

The control unit 11 shown in FIG. 1 is eminently suitable for use of a programmable control circuit, such as a microprocessor. By way of illustration FIG. 3 schematically shows the construction of the control unit 11, employing such a programmable control circuit, whilst FIG. 4 schematically represents a flow diagram of a control unit program suitable for this purpose.

In FIG. 3 corresponding elements bear the same reference numerals as in FIG. 1, such as the memory device 14, the D/A converter 15 and the comparator 17. In this case, the memory device 14 consists of a random access memory (RAM), the desired memory location being addressed by the control unit. The block 30 represents the programmable control unit, whilst the block 31 schematically represents the unit for generating a synchronizing signal T. In FIG. 1 this unit was constituted by the tachosystem 20 and 21, but it is obvious that any other system capable of supplying a clock signal T which is synchronized with the rotating record carrier may be employed. The numeral 12 designates an input gate for the error signal F, whose function corresponds to that of the input terminal 12 of FIG. 1. Furthermore, the control unit of FIG. 3 comprises two sample-and-hold circuits 32 and 33, whose inputs are connected to the output of the D/A converter and whose outputs are respectively connected to the comparator 17 and to the output terminal 13. The various units are coupled to each other by a data bus 34 for the exchange of signal values. The control unit 30 controls this exchange of signal values between the various units via an address bus 35.

FIG. 4 very schematically represents a flow diagram of the program for the control unit 30. The program is started in accordance with block 40. In accordance with block 41 the instant is then awaited at which a synchronizing pulse T (tacho pulse T in FIG. 1) appears. In block 42 the signal value M(n) stored in a memory location n is compared with the actual value of the error signal F, which means a detection of the polarity of the output signal of the comparator 17. Depending on the result of this detection the content of the relevant memory location is increased by one bit (block 43) or reduced by one bit (block 44). Subsequently, in block 45 this signal value is supplied to the D/A converter 15 and the analog signal value is supplied to the output terminal 13 by activation of the SH circuit 33. After this, in block 46, the address of the memory locations is increased by one, so that in block 47 the content of the next memory location (n+1) is transferred to the D/A converter 15 and is supplied to the comparator 17 by activation of the SH-circuit 32. Subsequently, the next synchronizing pulse T is awaited, after which again the comparison with the actual error signal F is performed.

It will be evident that the flow diagram of FIG. 4 is highly simplified. As an example, steps should be taken which ensure that the operations described in the foregoing are performed cyclically, in other words that the memory locations are addressed cyclically. On the basis of the desired signal operations it is obvious that furthermore a number of program variants may be designed, which all produce the same signal operations.

FIG. 5 shows an embodiment of the control loop in accordance with the invention used in a recording and reproducing apparatus for video information employing magnetic tape. It is assumed that the apparatus is of a type having two magnetic heads mounted on a head disc with the tape passing around the head disc along a helical path through a wrapping angle of 180°, so that parallel information tracks are formed on the tape, which make a slight angle with the longitudinal axis of the record. Consecutive information tracks are then scanned alternately by the two magnetic heads.

As both the width of and the spacing between the information tracks is minimized continually, it is generally desirable to ensure, via active control, that during reading of such a record carrier the magnetic heads accurately cooperate with the desired information tracks. In other words, it is desirable to control the position of the magnetic heads in a direction transverse to the track direction. In order to make this possible, each of the magnetic heads is mounted on an adjusting member, for example a piezoelectric deflection element, to which adjusting member is applied a control signal for positioning the relevant magnetic head relative to the information track.

In order to obtain a suitable control signal there should first of all be provided a detection system which is capable of measuring the position of the magnetic head relative to the desired track and of generating a corresponding error signal. Systems intended for this are known in a number of variants. Generally use is made of long-wave tracking signals recorded in the information tracks simultaneously with the video information. These tracking signals have a frequency and/or phase, which alternates from track to track in accordance with a fixed pattern. When a specific information track is scanned by a magnetic head, information about the position of the magnetic head relative to the desired information track is then obtained by comparison of signals induced into said magnetic heads by the tracking signals of the two adjacent tracks, so-called crosstalk signals, and a corresponding error signal is produced. As the manner in which the position of the magnetic heads is measured and the error signal is generated is of subordinate importance for the present invention, this is only represented schematically in the Figure. By way of illustration reference is made to the system as described in Netherlands Patent Applications Nos. 7409513, 7600470, 7705924. Since the invention is of special importance for the control during read-out of video information from the record carrier, FIG. 5 only shows the components which are active during reading.

In FIG. 5 the head disc is only represented schematically by the block 50. Mounted diametrically opposite each other on the head disc 50 are two magnetic heads K1 and K2. The magnetic heads are individually movable transversely to the track direction by means of adjusting members, for example piezo-electric deflection elements, schematically represented by the blocks 51 and 52. The signal read from the record carrier by the magnetic heads is taken from the rotary head disc 50 by means of a rotary transformer 53 for further processing. The detected signal comprises the desired video information, which is applied to a processing unit (not shown), and cross-talk signals from the adjacent track. The cross-talk signals are applied to a detection system 54 which derives the desired error signal F therefrom. Obviously, the construction of this detection system depends on the system of tracking signals. For embodiments of the system reference is made to the afore-mentioned Netherlands patent applications.

The control loop, furthermore, comprises the control unit 11, which receives the error signal F at its input terminal 12. The control signal processed by control unit 11 is applied to the input 58 of a switching unit 57 via a low-pass filter 56. This switching unit 57 inter alia serves to ensure that the generated control signal is applied to the adjusting member of the magnetic head, which instantaneously scans an information track. The switching unit 57 comprises two output terminals 59 and 60, the output terminal 59 being connected to the adjusting member 51 via a slip ring 69 and the output terminal 60 to the adjusting member 52 via a slip ring 70.

The control unit 11 is of a design which bears great similarity to the control unit shown in FIG. 1. Therefore, corresponding elements bear the same reference numerals. The design and mutual arrangement of the memory device 14, the digital-analog converter 15, the correction device 16 and the comparator 17 is identical to that of FIG. 1, so that the operation of those elements need not be discussed in more detail. The memory device 14 receives a synchronizing signal T from a tachosystem 72. This tachosystem 72 is rigidly coupled to the head disc 50 and supplies a fixed number of tacho pulses per revolution of said head disc. The control unit 11 then again realizes a transfer characteristic corresponding to the characteristic I in accordance with FIG. 2, the peaks being situated at the revolution frequency of the head disc and multiples thereof.

The control unit 11 shown in FIG. 5 deviates from that shown in FIG. 1 in that the output terminal 13 is not connected to the D/A converter 15 but to an additional D/A converter 55. The input of D/A converter 55 is connected to a tap on the memory device 14. This arrangement has been adopted because of the presence of the low-pass filter 56 and the characteristic of this filter. With the device shown it is generally desirable to have a transfer characteristic for the control loop which above a cut-off frequency, for example 200 Hz, drops steeply. In order to obtain such a characteristic, a multipole low-pass filter will have to be used for the low-pass filter 56, but this may affect the stability of the control loop. This can be overcome by selecting a characteristic for this low-pass filter such that the overall transfer characteristic of this filter in conjunction with the drive means 51 and 52 respectively most closely approximates a linear phase characteristic (Bessel filter). However, such a combination has the disadvantage that it introduces a delay. This additional delay may be compensated for in a simple manner by taking the output signal of the control unit 11 from a tap on the memory device 14. The signal obtained from the tap on the memory device 14 leads relative to the signal obtained from the output of the memory device (input D/A converter 15). In principle it is assumed that use is made of a memory device 14 comprising a digital shift register, which actually has a tap. When a random access memory (RAM) is employed this tap is not physically present, but in that case it is realized via the address of the memory locations.

Instead of the analog filter 56 it is obvious that alternatively a digital filter may be included before the D/A converter 55, which, in conjunction with the D/A converter, then performs the same function as the filter 56.

The control signal supplied by the control unit 11 is applied to the input terminal 58 of the switching unit 57 via the low-pass filter 56. As stated previously, this switching unit first of all serves to ensure that this control signal is applied to the correct adjusting member, namely the adjusting member of the magnetic head reading instantaneously. In order to achieve this, the switching unit 57 comprises two switches 67 and 68, whose master contacts are connected to the output terminals 59 and 60 respectively. An input contact of each of the two switches 67 and 68 is connected to the input terminal 58. The two switches are controlled by a common switching signal H1 in such a way that either output terminal 59 or output terminal 60 is connected to input terminal 58, so that the control signal is applied either to the adjusting member 51 or to the adjusting member 52. The switching signal $H_1$ is supplied by a control circuit 71. This control circuit 71 receives a synchronizing signal H from the tachosystem 72, which synchronizing signal should provide an indication in respect of which of the two magnetic heads performs the scanning and during which interval. For this purpose the tachometer system may comprise a single mark on a tachodisc, which coincides with the angular position of one of the magnetic heads. Via a suitably arranged transducer a synchronizing signal H can be obtained which per revolution of the head disc supplies one pulse which appears at the instant that one of the magnetic heads begins to scan an information track. The control circuit 71 then converts said synchronizing signal H into a symmetrical squarewave signal with a frequency equal to the revolution frequency of the head disc, the transitions between the two discrete values exactly coinciding with the instants at which the magnetic head by which the information tracks are scanned changes.

In addition to this function of supplying the control signal to the appropriate adjusting member the switching unit 57 performs another function. During the time interval that one of the magnetic heads (for example $K_1$) scans an information track, the second magnetic head ($K_2$) in principle need not be controlled in respect of its position. However, it will be evident that it is advantageous if, at the instants that said second magnetic head should begin to scan the next information track, its position with respect to said information track is optimum. As during normal operation the speed of transport of the record carrier and the speed of the head disc are reasonably constant, there will be a high degree of correlation between the positions to be occupied by a specific magnetic head at the beginning of the scanning of consecutive information tracks by said head. This means that the value of the control signal (the so-called initial value) which appeared at the beginning of the scan of an information track by a magnetic head is a suitable measure of the value of the control signal which will occur at the beginning of the next scan by the same magnetic head. This datum may be used to ensure that each of the magnetic heads before it begins to scan an information track has already been controlled to the approximately correct position.

For this purpose the switching unit 57 comprises two switches 61 and 62, which are connected to the input terminal 58 via resistor 73 and to two capacitors 63 and 64 respectively. The switches are controlled by two switching signals $B_1$ and $B_2$, which are supplied by the control circuit 71. These switches 21 and 22 are actuated so by said control signal that they are briefly closed at the beginning of the scan of an information track by each of the individual magnetic heads $K_1$ and $K_2$ respectively. As a result of this the initial value of the error signal at the beginning of the scan of magnetic head $K_1$ or $K_2$ is stored in the capacitance 63 or 64 respectively. Via follower circuits 65 and 66 the initial values stored are applied to a second input contact of the switches 67 and 68 respectively. It is then evident from the Figure that each time one of the adjusting members, in the present example the adjusting member 51, receives the control signal via the switching unit, whilst simultaneously the other adjusting member, i.e. the adjusting member 52, receives the initial value stored in the switching unit, so that this last-mentioned adjusting member already adjusts the associated magnetic head to a position suitable for the beginning of the scan.

In a similar way as the apparatus of FIG. 1, the apparatus of FIG. 5 is also extremely suitable for use of a programmable control circuit. This control circuit may then perform both the function of the control unit 11 and the function of the switching unit 57. FIG. 6 by way of illustration shows a block diagram of the apparatus employing a programmable control circuit, whilst FIG. 7 shows a flow diagram which may be used for said control circuit.

In FIG. 6 the block 80 represents the programmable control circuit which in a test set-up was of the type Intel 8748. The outputs $P_0$ through $P_7$ are connected to the D/A converter 15, which converts the applied 8-bit digital signal values into analog signal values. It is assumed that this P/A converter is of a type in which the analog signal value on its output is preserved until a new digital signal value is applied to its input. This analog signal value is applied to the comparator 17 for comparison with the actual value of the error signal. The output of the comparator 17 is connected to the input $P_{10}$ of the control circuit 80. Input $P_{12}$ of the control circuit receives a logic signal R/P which indicates whether recording or reproduction is effected. For the sake of simplicity it is assumed hereinafter that reproduction is effected, because the control system is primarily intended for this purpose. To input $P_{13}$ the control signal $H_1$ is applied as generated by the control circuit 71 of FIG. 5. This control signal $H_1$ consequently has a logic value 1 if a first one of the two magnetic heads scans an information track and has a logic value 0 if the other magnetic head reads an information track. Input $T_1$ of the control circuit 80 receives the tachosignal T from the tachosystem 71 of FIG. 5. It is assumed that this tachosignal T comprises 72 pulses per revolution of the head disc. The output of the D/A converter 15 is finally connected to two sample-and-hold circuits 81 and 82, whose outputs are respectively connected to the adjusting members 51 and 52. The circuits 81 and 82 are controlled by the outputs $T_{20}$ and $T_{21}$ respectively of the control circuit 80.

The operation of the apparatus of FIG. 6 is explained with reference to the flow diagram of the programme used in the control circuit 80 and shown in FIG. 7. The programme is started by block 90. Subsequently, in block 91, a value equal to half the maximum attainable value is written into all memory locations (M) of the random access memory intended for storing the error signals.

In accordance with decision block 92 the instant is awaited at which the signal on input $P_{13}$, i.e. signal $H_1$ changes from a logic "0" to a logic "1". This is the instant at which one of the magnetic heads (for example $K_1$) begins to scan an information track. In block 93 the content of the memory location 36 is transferred to the D/A converter 15 at this instant and simultaneously output $P_{21}$ is activated, so that the signal value supplied by the D/A converter 15 is supplied to the adjusting member 52 as initial value by the SH circuit 82. In block 94 the address n for the memory locations is subsequently set to 0. In block 95 the content of the memory location n is applied to the D/A converter 15 and converted into an analog signal value. In decision block 96 the instant is awaited at which the input $T_1$ becomes a logic "1", i.e. until a tachopulse P appears. At this instant it is ascertained in accordance with block 97 whether input $P_{10}$ is a logic "1", i.e. whether the actual error signal on input terminal 12 is greater than the signal value supplied by the D/A converter 15. If this is the case the content of the memory location (n) is raised by one bit, otherwise the content of this memory location is reduced by one bit in accordance with block 99.

In block 100 it is subsequently ascertained whether magnetic head $K_1$ is scanning an information track. If this is the case, the content of the memory location (n+2) is applied to the D/A converter 15 in accordance with block 101 and simultaneously output 20 is rendered active, so that the analog signal value supplied by the D/A converter 15 is supplied to the adjusting member 51 via the SH-circuit 81. If in block 100 the requirement $P_{13}=1$ is not met, the signal value read from the memory location (n+2) is applied to the adjusting member 52 via the D/A converter 15 and SH-circuit 82.

Subsequently, in block 103 the address for the memory location is increased by "1" (n=n+1). Thereafter in block 104 it is ascertained whether the address number n is smaller than or equal to 36. As long as this is the case, the program cycle each time returns to block 95. The loop thus formed is thus traversed during the period that the magnetic head $K_1$ performs the scanning.

If the address number n is greater than 36, it is first ascertained in block 105 whether this address number n is equal to 37. If this requirement is met, it means that magnetic head $K_2$ begins to scan an information track, and the content of the memory location n=0 is supplied, in block 106, as an initial value to the adjusting member 51 of magnetic head $K_1$ via the D/A converter 15 and the SH-circuit (activation of $P_{20}$). After this instruction has been performed or if the requirement of block 105 has not been met, it is ascertained in block 107 whether the address number n is equal to 72. If this is not the case the program cycle proceeds to block 95. The loop thus obtained is traversed during the time interval that the magnetic head $K_2$ effects the scanning. However, if the address number n=71 the magnetic head $K_2$ has reached the end of the scan and the process returns to block 92.

For the correct operation of the program some further instructions are required, which are not indicated as such in the flow diagram. If the address number n has reached the value 70, the process continues with block 95 after block 107. However, the address number (n+2) mentioned with reference to the next loop in block 101 and 102 would then be equal to 72. However, it is obvious that at this instant the memory location n=0 is to be read again. A similar complication occurs when n=71 is reached, while in blocks 101 and 102 it is obviously not the memory location n=73 but the memory location n=1 which is to be addressed. These two problems can be solved simply by detecting the two conditions n=70 and n=71, respectively, in the program loop which includes the blocks 95-107 and in the case of a positive detection to replace the address number n+2 in the instruction in accordance with blocks 101 and 102 by n=0 and n=1, respectively.

In the flow diagram of FIG. 7, the correction applied to the content of a memory location is always a fixed value, namely ±1, in accordance with the blocks 98 and 99. This means that after starting the programme it may take a fairly long time before the content of the memory locations reasonably corresponds to the variation of the error signal during one revolution of the head disc, because the content of each memory location is subject to a correction of only one bit per revolution of the head disc. In order to remedy this the correction may be rendered adaptive, i.e. the magnitude of the correction is rendered dependent on the previous situation. For this various possibilities are conceivable. A very simple possibility which requires only a slight adaptation of the flow diagram is represented in FIG. 7 by the blocks 108 through 112. Block 108 has been inserted between block 97 and block 99 and counts the number of times that block 99 becomes active per revolution of the head disc. Blocks 109 through 112 are included in the connection between blocks 107 and block 92. Block 109 ascertains whether the count B of block 108 equals 72 of 0. If this is the case, it means that all signal values stored in the memory were too great or all signal values stored in the memory were too small relative to the associated actual values of the error signal during the completed revolution of the head disc. The correction performed by the blocks 98 and 99 now does not have a fixed value (±1), but is variable (±Δ). Since B=0 or B=72 is an indication that there is still a substantial discrepancy between the memory content and the actual error signal, the correction factor Δ in that case is adjusted to a comparatively high value, for example 4, in block 110, while if the requirement B=0 or B=72 is not met this correction factor Δ is adjusted to the value 1 in accordance with block 111. The blocks 98 and 99 thus perform a correction with a correction factor Δ which depends on the previous situation. In block 112 the count B is set to 0 after ever revolution of the head disc.

It will be evident that the invention is by no means limited to the embodiments shown in the Figures. In particular, it is obvious that when use is made of a programmable control circuit a multitude of variants are possible, which are realized via the programming of this control circuit. Depending on the specific requirements imposed on a specific control loop the desired refinement of the control behaviour can be achieved via this programming.

What is claimed is:

1. A control loop for controlling a control quantity, said control loop comprising
    a detection system for supplying an error signal which is indicative of the difference between the instantaneous value and the desired value of the control quantity, and
    a control unit having an input terminal, which is coupled to the detection system, for receiving the error signal, and an output terminal, said control unit having a transfer characteristic with a number of peaks at a fundamental frequency and harmonics thereof and including
    a memory device with a plurality of memory locations for storing digitally coded signal values,
    a digital-analog converter, coupled to the memory device, for converting the digitally coded signal values supplied by the memory device into analog signal values,
    means for applying said analog signal values to said output terminal,
    comparison means for comparing the value of a signal value read from the memory device with the value of said error signal supplied by the detection system,
    correction means, coupled to the memory device and to the comparison means, for correcting the signal values obtained from the memory device in dependence on the signal supplied by the comparison means, the correction applied having a maximum value which is small relative to the maximum attainable signal value,
    and means for controlling read out and storage of said signal values in the memory device so that a number of signal values are read out from the memory device in accordance with a recurrent cycle and, after each read out of a signal value, the corrected signal value supplied by the correction means is stored in the memory instead of the signal value previously read, the cycle having a period equal to that associated with the fundamental frequency,
    said loop further comprising a control device, coupled to said output terminal of said control unit, for changing the control quantity in response to said signal values.

2. A control loop as claimed in claim 1, wherein the correction means are adapted to increase or decrease the digital signal values read from the memory device by a predetermined value depending on the polarity of a signal supplied by the comparison means.

3. A control loop as claimed in claim 2, wherein the predetermined value is a constant value.

4. A control loop as claimed in claims 1, 2 or 3 wherein the comparison means includes a differential amplifier having a first input which is coupled to the input terminal of the control unit, and a second input which is coupled to the output of the digital-analog converter.

5. A control loop as claimed in claim 1 including means for supplying to said output terminal analog signal values corresponding to digital signal values which have been read from the memory device and which lead the signal values applied to the comparison means.

6. A control loop as claimed in claim 1, wherein the filter network comprises a limiting circuit for limiting the output signal of said filter network to a predetermined value.

7. The control loop as claimed in claim 1 wherein said applying means includes an adder having a pair of inputs one of which is coupled to an output of said converter and an output coupled to said output terminal of said control unit, said control loop further comprising a filter network connected between said input terminal of said control unit and the other of said inputs of said adder, said adder summing the signals at said pair of inputs thereof and supplying the sum signal to said output terminal as a control signal for said control device.

8. A control loop as claimed in claim 1 wherein said means for controlling said memory device is programmable.

9. A control loop for controlling a quantity such as the position of a movable member or the like, said loop comprising:
    means for generating an error signal which is indicative of the difference between the instantaneous value and the desired value of said quantity,
    means having a plurality of storage locations for storing a plurality of digitally coded signal values,
    means, coupled to said storage means, for changing said quantity in dependence on said signal values read out from said storage means,
    means, coupled to said generating means and said storage means, for comparing said signal values read from said storage means with said error signal and supplying an output signal in dependence on the values of the signals being compared,
    means, coupled to said storage means and said comparing means, for correcting said signal values in dependence on said output signal by an amount which is small relative to the maximum attainable value of said signal value, and means for controlling read out of said signal values from said storage means and storage of the corrected signal values in the said storage means in a manner such that a predetermined number of said signal values are read from said storage means during a reoccurrent cycle and, after each read out of a signal value, the corrected signal value supplied by said correction means is stored in said storage means and replaces the signal value previously read out so that said control loop has a transfer characteristic with a number of peaks at a fundamental frequency with a period equal to the period of said cycle and harmonics of said fundamental frequency.

10. The control loop according to claim 9 including means connected between said storage means and said changing means for converting said digitally coded signal values read from said storage means into analog signal values.

11. The control loop according to claims 9 or 10, wherein said digital signal values read from said memory are increased or decreased by said correction means by a predetermined amount depending on the polarity of said output signal supplied by said comparing means.

* * * * *

UNITED STATES PATENT AND TRADEMARK OFFICE
CERTIFICATE OF CORRECTION

PATENT NO. : 4,286,318

DATED : August 25, 1981

INVENTOR(S) : KORNELIS A. IMMINK ET AL

It is certified that error appears in the above-identified patent and that said Letters Patent is hereby corrected as shown below:

Title page:

Please change the foreign priority date from "May 3, 1979" to -- March 5, 1979 --.

Signed and Sealed this

Eleventh Day of June 1985

[SEAL]

Attest:

DONALD J. QUIGG

Attesting Officer     Acting Commissioner of Patents and Trademarks